Figure 1:
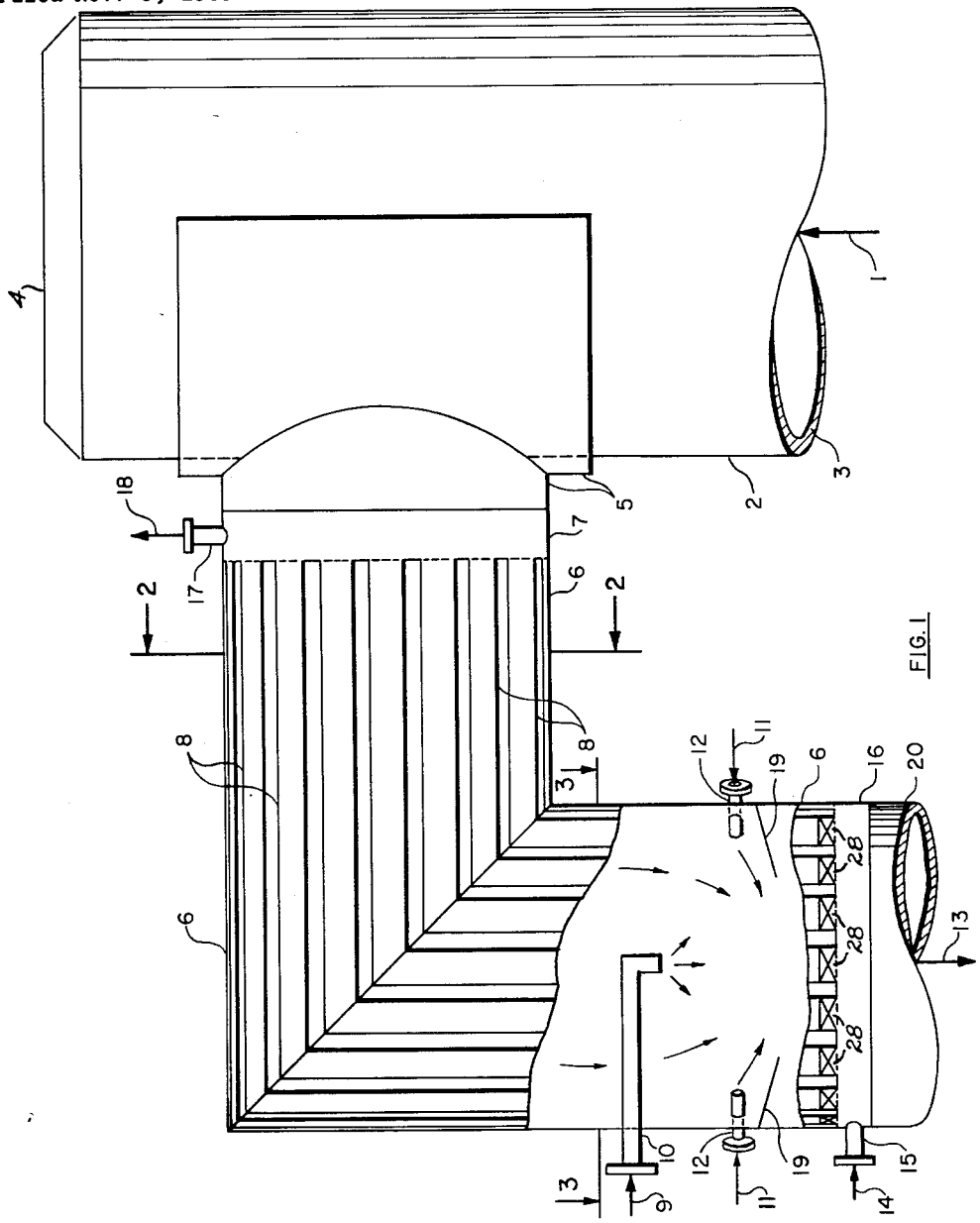

FRANK C. BRAEMER JR.
DANIEL E. PIKE
INVENTORS

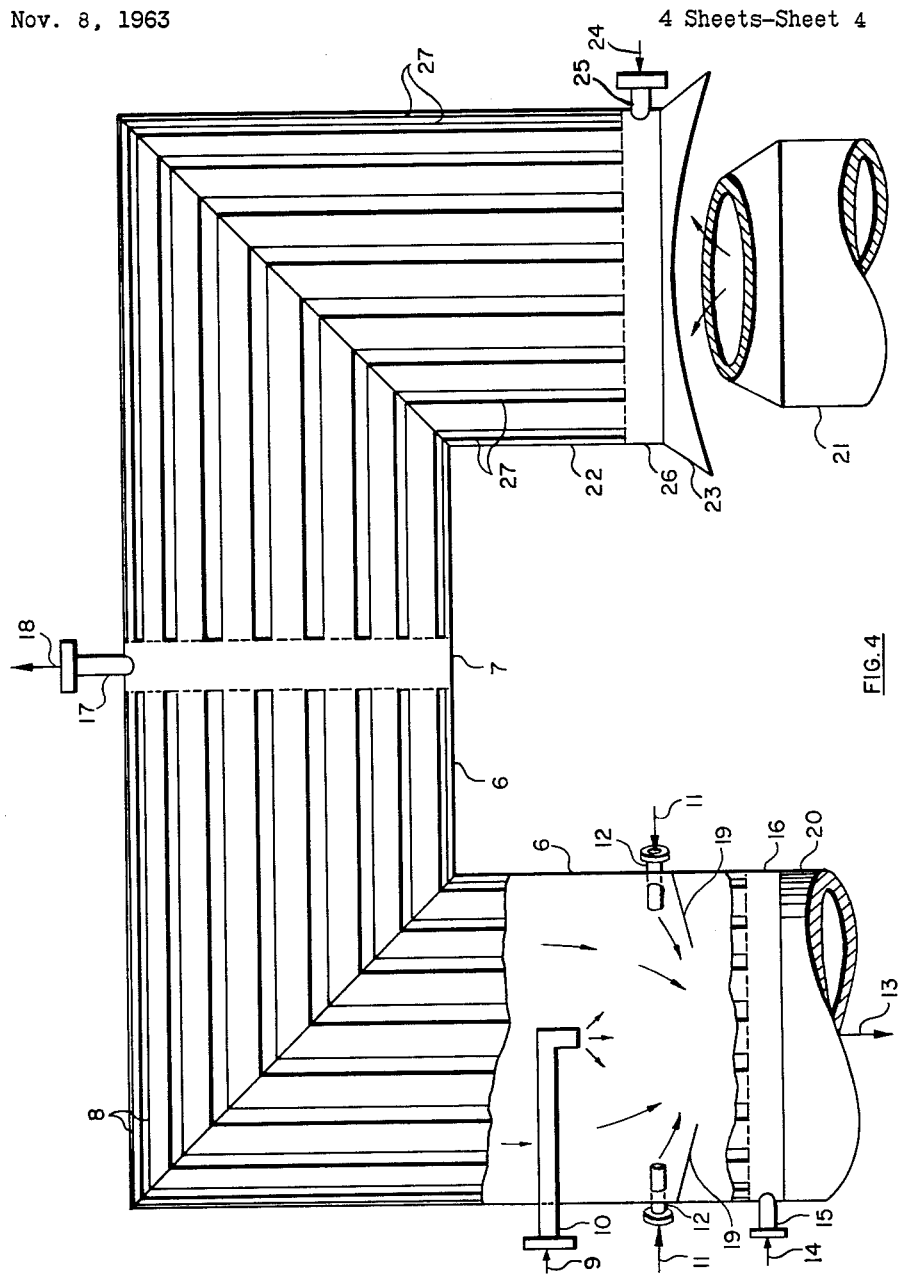

United States Patent Office 3,262,685
Patented July 26, 1966

3,262,685
GAS QUENCHER
Daniel E. Pike, Emerson, and Frank C. Braemer, Jr., Teaneck, N.J., assignors to Chemical Construction Corporation, New York, N.Y., a corporation of Delaware
Filed Nov. 8, 1963, Ser. No. 322,351
3 Claims. (Cl. 261—157)

The present invention relates to an apparatus for quenching and scrubbing hot gas process streams, such as the hot flue gas which is discharged from an oxygen converter during the blow period. A novel apparatus arrangement is provided, in which a crossover duct is externally cooled in a novel manner. The crossover duct serves to conduct the hot gas stream from a refractory-lined source or hot gas collection hood to a quench spray, which preferably consists of a novel apparatus arrangement for simultaneously quenching and scrubbing the gas stream in an improved manner.

The withdrawal and quenching of hot gas streams such as the gas discharged from an oxygen converter during the blow period presents numerous design problems. A principal consideration involves the fact that such gas streams, which are derived at temperatures up to 3000° F., are difficult to contain in conventional metallic ducts prior to quench cooling. Thus, it has been the practice either to discharge such gases through a refractory lined stack or to pass the gases through refractory lined ductwork prior to quench. Provision of a refractory lining in ductwork is objectionable, because of eventual deterioration due to spalling. In addition, localized overheating and hot spots may also develop.

The general concept of providing ductwork for this purpose which is externally cooled with water has also been suggested in the prior art. However, such prior art concepts have been of limited value due to non-uniform cooling and consequent differential expansion of the ductwork, which causes stresses and actually breaks or cracks the duct, or the development of hot spots. In addition, prior external cooling systems have not been amenable to regulation of the differential cooling rate over various areas of the duct so as to provide uniform temperatures or temperature gradient.

In the present invention, external cooling of the duct which carries the hot gas stream from a refractory-lined source such as a stack to a quench scrubber is accomplished in a novel manner. This duct, which is generally horizontal and is known as a cross-over duct, is provided with a plurality of external channels which are welded or otherwise fastened to the outside surface of the duct. Cooling water is passed through the channels, and serves to maintain the duct at a uniform low operating temperature. The duct generally ends in a downward direction, and a liquid water quench spray is projected into the hot gas stream in the downward section of the duct.

This arrangement provides numerous advantages, in that the duct is maintained at a substantially uniform low temperature. Localized overheating or the development of hot spots is effectively prevented, since the provision of individual channels assures uniform water flow in contact with the outer surface of the duct. The flow of water in individual channels may be regulated by providing an individual control valve for each channel to avoid differential thermal expansion of the duct, which otehwise may readily take place due to non-uniform flow of the hot gas within the duct, and consequent regional concentration of thermal effects.

It is evident that the concept of cooling a cross-over duct by the provision of individual external channels through which cooling water is circulated may be extended to the case where a furnace or other source of hot gas is provided with an opening about which an external metallic gas collection hood is disposed. In this case, the individual external channels would be extended to cool the hood as well as the gas transfer or cross-over duct.

Another aspect of the present invention involves the provision of a novel apparatus arrangement for simultaneously quenching and scrubbing the hot gas stream. The problem of quenching and scrubbing a large volume flow of hot gas is complicated by the fact that a relatively large volume of quench water must be provided, and this large quench water stream must be rapidly and completely dispersed into the hot gas stream so as to provide uniform quenching and scrubbing. Total penetration by the liquid and consequent rapid cooling of the hot gas stream to equilibrium is desirable, in order to obviate the necessity for an insulated or thermally resistant conduit downstream of the gas-liquid contact zone. In addition, pressure drop considerations are important, and it is most desirable to achieve gas quench with minimum loss of fluid pressure head. These various design requirements are met by the novel gas quench apparatus of the present invention, which is preferably provided downstream of the cross-over duct to quench the hot gas stream.

The quench apparatus is relatively simple, and involves the provision of a plurality of water jets discharging from nozzles, and a single flow constriction baffle in the form of a truncated cone. The conical baffle is inverted, and disposed in the vertical section of the cross-over duct with its base contiguous with the inner wall of the duct. Thus, the cone extends downward and restricts the down-flowing gas stream to a reduced cross-sectional flow path, with subsequent discharge of the gas stream to a lower downcomer conduit of larger cross-section in which final equilibrium between the gas stream and quench water is attained. A main central spray nozzle is axially disposed in the duct above the baffle, and a large stream of quench water is centrally dispersed into the gas stream in a generally downwards direction. This stream of quench water consists of a spray of water droplets. In addition, a plurality of water nozzles are tangentially disposed adjacent to the base of the conical baffle, and discharge water streams in the form of solid jets. A film of water is thus maintained on the upper surface of the baffle. The water film whirls downwards across the surface of the baffle in a spiral path, and subsequently projects into the gas stream. It has been determined that the water flow patterns thus established serve to effectively contain the hot gas stream within the quench water, with rapid attainment of complete gas-liquid equilibrium.

It is an object of the present invention to provide an improved apparatus for the transfer of hot gas from a thermal source to a quench cooling means.

Another object is to provide a crossover duct which is externally cooled in a novel manner.

A further object is to provide a metallic duct for conducting a hot gas stream from a refractory-lined stack to quench means, which is externally cooled in a novel manner.

An additional object is to provide a novel apparatus for transfer of hot gas from a thermal source to a novel quench apparatus.

Still another object is to provide a novel quench apparatus for simultaneously quenching and scrubbing hot gas streams.

Still a further object is to provide a novel quench apparatus in which complete equilibrium between quench water and a hot gas stream is rapidly attained.

Figure 2:
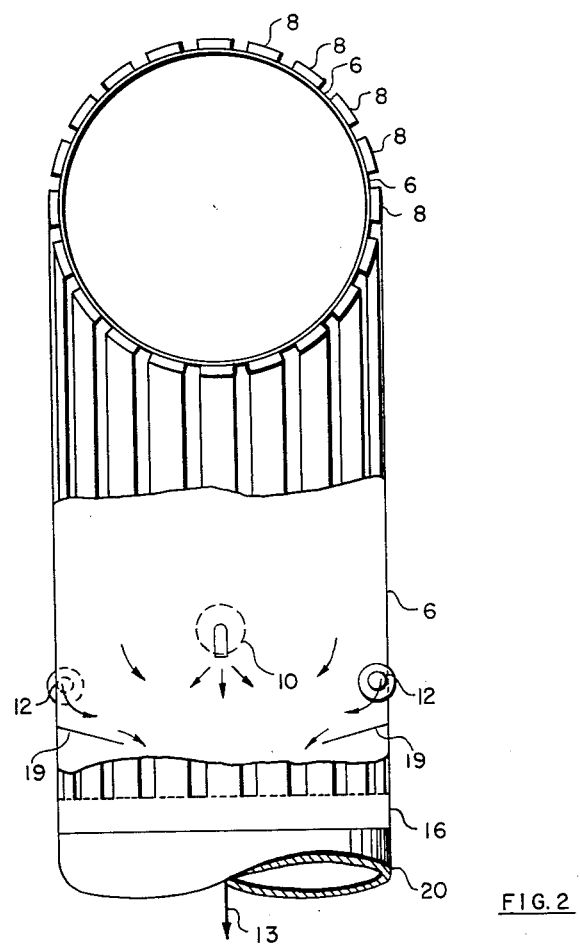
Figure 3:
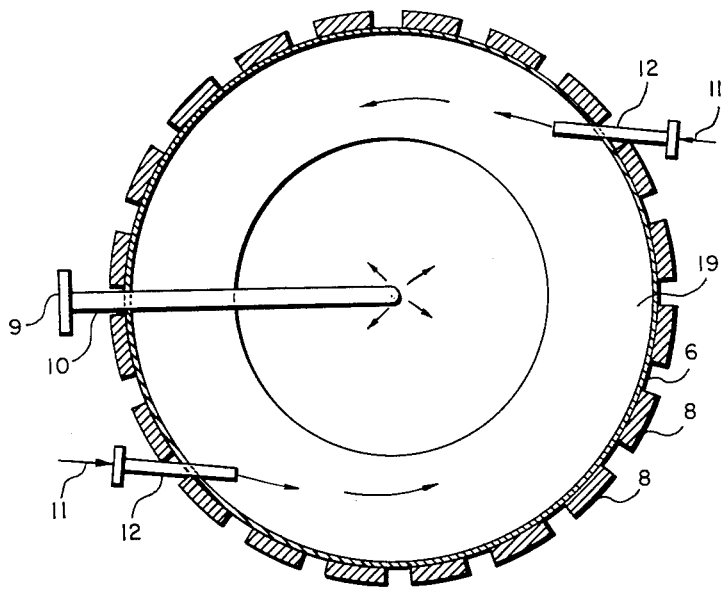

These and other objects and advantages of the present invention will become evident from the description which follows. Referring to the figures, FIGURE 1 is an overall view of the novel cross-over duct in combination with the quench spray apparatus of the present invention, FIGURE 2 is a sectional elevation view of FIGURE 1 taken on section 2—2, showing the circumferential arrangement of the duct channels, FIGURE 3 is a sectional plan view of FIGURE 1 taken on section 3—3, showing the circumferential arrangement of the duct channels and the quenching baffle arrangement in plan view, and FIGURE 4 provides an alternative arrangement of the apparatus of the present invention, in which the cross-over duct serves to withdraw hot gas from a metallic hood which is disposed about an opening in a furnace or other hot gas source. In this case, the individual external cooling channels are provided to cool the hood as well as the duct.

Referring to FIGURE 1, a hot gas stream 1, typically the waste gas from an oxygen converter produced at 3000° F. is passed upwardly through stack 2 which is provided with refractory lining 3. The hot gas stream is diverted by fan draft into transition section 5, which is a water jacketed coupling element serving to pass the hot gas stream horizontally into the cross-over duct of the present invention. Damper 4 is a cap at the top of the stack 2 and is opened only during emergencies.

The hot gas stream now passes into crossover duct 6, passing cooling water outlet manifold 7 and entering the main part of the duct 6 which is provided with external channels 8 through which cooling water is flowing. The cooling water flowing in channels 8 is in contact with the surface of duct 6 and serves to maintain the duct at a relatively uniform low operating temperature, even though an extremely hot gas stream is flowing within the duct.

The hot gas stream now is diverted downwards in the vertical section of duct 6, and is quench-cooled by a water stream, which also serves to scrub the gas stream and remove entrained solid particles. In a preferred embodiment, the hot gas stream is contacted first with a central water spray, consisting of water stream 9 which is admitted via 10 and sprayed outwards from the center of the gas stream. The water stream sprayed in via 10 contacts the gas stream in cooperating combination with water jet streams 11, admitted via tangential nozzle inlets 12 above baffle 19. The water streams 11 are discharged onto baffle 19 in the form of solid jets. Baffle 19 is a flow constriction baffle in the form of an inverted and truncated cone, which is disposed in the vertical section of the cross-over duct with its base contiguous with the inner wall of the duct. Thus, the conical baffle 19 extends downward and restricts the down-flowing gas stream to a reduced cross-sectional flow path. The tangential nozzle inlets 12 serve to disperse a whirling film of water downwards in a spiral path across the upper surface of baffle 19. This water film subsequently projects from the bottom of baffle 19 into the gas stream thus serving to provide an outer perimeter of water around the gas stream during quench. The combined action of streams 11 and 9 serves to rapidly and completely quench the gas stream, with a uniform scrubbing action also being attained. Most importantly, a short circuiting or turbulent flow of the hot gas stream is prevented, and consequently the lower downcomer conduit 20 does not have to be of a refractory nature or otherwise thermally insulated.

The quench-cooled gas stream now leaves the apparatus via 13, together with entrained liquid water. The entrained water is separated from the cooled gas stream by conventional means downstream of downcomer 20, and may be recycled via 9 and 11. It is evident that this arrangement permits the usage of dirty water containing entrained solids as a quench cooling medium. In some cases, when the quenching effect is the primary consideration, the proportion of quench water admitted via 9 and 11 relative to the volume of hot gas passing through duct 6 may be such that all of the quench water is evaporated into the gas stream. In this case, stream 13 would not contain any liquid water but instead would consist entirely of a gaseous phase containing water vapor. In most cases, however, excess liquid quench water will be provided, such that a gas scrubbing action is obtained.

The cooling water for the channels 8 is provided by water stream 14, which is passed via 15 into inlet manifold 16. The rate of flow of cooling water from manifold 16 into each individual channel 8 is preferably controlled by providing an individual control valve 28 for each channel, so as to maintain the surface of the duct 6 at a substantially uniform temperature and thus avoid differential thermal expansion of the duct 6 due to non-uniform flow of the hot gas within the duct 6. The cooling water passes upwards through channels 8 in the vertical portion of duct 6, and horizontally to outlet manifold 7. The warmed cooling water is finally passed via 17 to discharge via 18. The warmed water stream 18 may be passed to a cooling tower, not shown, and recirculated via 14.

Referring now to FIGURE 2, which is a sectional elevation view of duct 6, the cooling channels 8 are shown in cross-section. In addition, the tangential aspect of inlet nozzles 12 relative to duct 6 is evident.

FIGURE 3 provides a sectional plan view of the vertical portion of conduit 6, and illustrates the tangential nature of water inlet nozzles 12. It is evident that the number of nozzles 12 provided in practice may be greater than 2, thus in some instances 3 or 4 tangential nozzles 12 may be arranged about the perimeter of duct 6, so as to uniformly disperse a film of water on the upper surface of baffle 19. The gas flow constriction provided by baffle 19 is clearly evident from FIGURE 3.

Numerous alternatives may be practiced within the scope of the present invention. Thus, for example, the spray arrangement involving elements 10 and 12 provides the best mode of carrying out the quench-cooling step of the present invention, however other spraying arrangements may be provided for this purpose. Thus, in cases where pressure drop considerations are important, baffle 19 may be omitted and inlets 12 may consist of tangential spray nozzles or jets. This arrangement is of reduced effectiveness, however in some instances adequate quenching may be attained with minimized loss of gas pressure head.

In order to reduce the volume of circulating cooling water, while still maintaining the duct 6 at a suitable low operating temperature, it is possible in practice to initially circulate the cooling water through one group of channels 8, and then to use the same cooling water in a second and third group of channels 8. In this case, manifolds 16 and 7 are suitable partitioned with interconnections to allow circulation of the same water to different groups of channels 8. This arrangement serves to provide higher water velocity and consequent improved heat transfer rates.

The general configuration of duct 6 as shown is preferable for purposes of fabrication, however, duct 6 may alternatively be curved from a horizontal gas inlet at transition piece 5 to a vertical quench-cooling section.

Other alternatives within the scope of the present invention will readily occur to those skilled in the art. Thus for example, other liquid quench mediums besides water may be provided in suitable instances. In some cases where the initial hot gas stream has an appreciable fuel value, the liquid quench medium may consist of a liquid petroleum fraction, which would be concomitantly cracked and gasified during the quenching step thus enriching the gas stream and adding to its fuel value. This alternative could be of value in instances where the hot gas stream consists of blast furnace gas which has an appreciable content of carbon monoxide, and the gas stream is to be utilized as a fuel gas.

Another alternative arrangement would consist of a case where the cross-over duct 6 does not withdraw hot gas from a refractory-lined stack 3, but instead the duct 6 extends from an external metallic gas collection hood which is disposed about an opening in a furnace or other source of hot gas. In this case, as shown in FIGURE 4, furnace 21 is a source of hot gas, such as an oxygen converter for steel manufacture. Unit 21 is provided with a gas collection hood 22 having a lower lip or gas baffle 23 which extends about an upper gas discharge opening in furnace 21. Cooling water stream 24 is passed via inlet nozzle 25 into manifold 26. A plurality of external channels 27 extends upwards across the outer surface of hood 22 from manifold 26, and thus cooling water stream 24 is directed into channels 27 and passes upwards for subsequent discharge, preferably into manifold 7 where the cooling water passing through channels 27 is combined with the cooling water from channels 8. The combined streams of warmed cooling water are discharged as stream 18 via outlet 17. It will be evident that a separate discharge manifold may alternatively be provided for the warmed cooling water discharged from channels 27.

The hot gas discharged from furnace 21 passes upwards through hood 22, and thereafter passes through cross-over duct 6 and is quench-cooled and scrubbed in a vertical section of duct 6 by quench liquid streams 9 and 11 in a manner described supra. Thus, stream 9 is centrally sprayed into the hot gas stream via 10, and stream 11 is passed by tangential nozzles 12 onto the upper surface of baffle 19, which serves to restrict the gas flow during the gas-liquid contact. The resulting stream 13 consisting of cooled gas and entrained liquid is passed to further processing as required.

We claim:

1. An apparatus for transferring and quench-scrubbing a hot gas stream containing entrained solid particles which comprises a duct extending from hot gas supply means and terminating with a vertically downward section, said duct being provided with a plurality of parallel spaced apart external channels on its outer surface, said channels being oriented parallel to the central axis of said duct, means to pass cooling water through said channels whereby overheating of said duct is prevented, each of said channels being provided with an individual valve for control of water flow rate, whereby said duct is maintained at a substantially uniform temperature, a baffle extending inwards and downwards from the wall of said duct in said downward section and terminating at a central opening, a plurality of nozzles extending into said duct adjacent to the base of said baffle, said nozzles being substantially tangential to the wall of said duct, means to pass quench liquid through said nozzles whereby a film of quench liquid is discharged onto the upper surface of said baffle and whirls downward in a spiral path upon the upper surface of said baffle and is projected into said gas stream, and a centrally positioned liquid quench spray in said downward section of said duct, said quench spray being above said baffle and serving to disperse quench liquid downwards and outwards into said hot gas stream, whereby entrained solid particles are removed from said hot gas stream into quench liquid and said hot gas stream is cooled.

2. An apparatus for conducting a hot gas stream containing entrained solid particles to a liquid water quench and quench-scrubbing said hot gas stream which comprises a cylindrical horizontal duct extending from hot gas supply means, a cylindrical vertical duct extending downwardly from the end of said horizontal duct, said ducts being provided with a plurality of parallel spaced apart external channels on their outer surfaces, said channels being oriented parallel to the central axes of said ducts with each of said channels extending continuously external to both said horizontal duct and said vertical duct, means to pass cooling water through said channels whereby overheating of said ducts is prevented, each of said channels being provided with an individual valve for control of water flow rate, whereby said ducts are maintained at a substantially uniform temperature, a centrally positioned liquid water quench spray in said vertical duct, said quench spray serving to disperse quench liquid downwards and outwards into said hot gas stream, a circular baffle extending inwards from the wall of said vertical duct below said quench spray, said baffle consisting of an inverted truncated cone with its base contiguous with the inner wall of said vertical duct, a plurality of nozzles extending into said duct adjacent to the base of said baffle, said nozzles being substantially tangential to the wall of said vertical duct, and means to pass quench water through said nozzles whereby a film of quench water is discharged onto the surface of said baffle and whirls downward in a spiral path upon the upper surface of said baffle and is projected into said gas stream, and whereby entrained solid particles are removed from said hot gas stream into quench water and said hot gas stream is cooled.

3. An apparatus for transferring and quench-scrubbing a hot gas stream containing entrained solid particles which comprises a hood extending about an opening in hot gas generation means, said hood being provided with a first plurality of parallel spaced apart external channels on its outer surface, said first plurality of channels being oriented parallel to the central axis of said hood, a cylindrical duct extending from the outlet of said hood and terminating with a vertically downward section, said duct being provided with a second plurality of parallel spaced apart external channels on its outer surface, said second plurality of channels being oriented parallel to the central axis of said duct, means to pass cooling water through said first and second plurality of channels whereby overheating of said hood and said duct is prevented, each of said second plurality of channels being provided with an individual valve for control of water flow rate, whereby said duct is maintained at a substantially uniform temperature, a circular baffle extending inwards from the wall of said duct in said downward section, said baffle consisting of an inverted truncated cone with its base contiguous with the inner wall of said duct, a plurality of nozzles extending into said duct adjacent to the base of said baffle, said nozzles being substantially tangential to the wall of said duct, means to pass quench liquid through said nozzles whereby a film of quench liquid is discharged onto the upper surface of said baffle and whirls downward in a spiral path upon the upper surface of said baffle and is projected into said gas stream, and a centrally positioned liquid quench spray in said downward section of said duct, said quench spray being above said baffle and serving to disperse quench liquid downwards and outwards into said hot gas stream, whereby entrained solid particles are removed from said hot gas stream into quench liquid and said hot gas stream is cooled.

References Cited by the Examiner
UNITED STATES PATENTS

| | | | |
|---|---|---|---|
| 798,287 | 8/1905 | Lawton et al. | 261—7 |
| 895,790 | 8/1908 | Richards | 261—76 |
| 1,543,942 | 6/1925 | Mathesius | 55—90 |
| 1,787,790 | 1/1931 | Mastenbrook | 261—116 |
| 1,894,696 | 1/1933 | Lindemann | 261—116 |
| 2,239,595 | 4/1941 | Cummings | 55—222 X |
| 2,481,164 | 9/1949 | Sherman et al. | 126—73 |
| 2,482,261 | 9/1949 | Goddard | 165—154 X |
| 2,589,149 | 3/1952 | Schneible et al. | 269—24 |
| 3,016,695 | 1/1962 | Lovingham | 165—169 X |
| 3,044,257 | 7/1962 | Shesta | 165—154 X |
| 3,212,761 | 10/1965 | Willett | 55—241 X |

ROBERT F. BURNETT, *Primary Examiner.*

HARRY B. THORNTON, *Examiner.*

D. K. DENENBERG, *Assistant Examiner.*